US 8,819,028 B2

(12) United States Patent
Luo et al.

(10) Patent No.: US 8,819,028 B2
(45) Date of Patent: Aug. 26, 2014

(54) SYSTEM AND METHOD FOR WEB CONTENT EXTRACTION (75) Inventors: Ping Luo, Beijing (CN); Jian Fan, San Jose, CA (US); Samson J. Liu, Mountain View, CA (US); Yuhong Xiong, Mountain View, CA (US); Jerry J. Liu, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/258,482

(22) PCT Filed: Dec. 14, 2009

(86) PCT No.: PCT/CN2009/075545
§ 371 (c)(1),
(2), (4) Date: Sep. 22, 2011

(87) PCT Pub. No.: WO2011/072434
PCT Pub. Date: Jun. 23, 2011

(65) Prior Publication Data
US 2012/0303636 A1    Nov. 29, 2012

(51) Int. Cl.
*G06F 17/30* (2006.01)
*G06F 3/12* (2006.01)
(52) U.S. Cl.
CPC ........ *G06F 17/30896* (2013.01); *G06F 3/1246* (2013.01)
USPC .......................................... 707/748; 715/241

(58) Field of Classification Search
USPC ............. 707/3, 7, 661, 5, 803, 748, 706, 723, 707/770, 710, 711; 715/763, 241, 517
See application file for complete search history.

(56) References Cited

U.S. PATENT DOCUMENTS

| | | | |
|---|---|---|---|
| 6,948,119 B1 * | 9/2005 | Farmer et al. | 715/206 |
| 2002/0178183 A1 | 11/2002 | Meding | |
| 2006/0106798 A1 * | 5/2006 | Wen et al. | 707/7 |
| 2007/0293950 A1 | 12/2007 | Haugen et al. | |
| 2008/0154873 A1 * | 6/2008 | Redlich et al. | 707/5 |
| 2008/0256120 A1 * | 10/2008 | Kobayashi et al. | 707/102 |
| 2008/0307301 A1 * | 12/2008 | Decker et al. | 715/241 |
| 2010/0010968 A1 * | 1/2010 | Redlich et al. | 707/3 |
| 2010/0115436 A1 * | 5/2010 | Embley et al. | 715/763 |
| 2010/0250497 A1 * | 9/2010 | Redlich et al. | 707/661 |

FOREIGN PATENT DOCUMENTS

| CN | 101114284 | 1/2008 |
|---|---|---|
| CN | 101515272 | 8/2009 |

* cited by examiner

*Primary Examiner* — James Trujillo
*Assistant Examiner* — Thong Vu (57) ABSTRACT A method and system for extracting Web content is disclosed. In one embodiment, Web content in a Webpage is extracted by identifying paragraphs in the Web content based on line-break node determination. A range of text-body associated with the identified paragraphs is then identified using a maximum scoring subsequence. Further, the identified text-body is refined using a heuristic rule of substantially horizontal alignment. Furthermore, one or more titles and one or more images associated with the Web content are extracted. Moreover, the Web content including the identified paragraphs, the one or more titles and the one or more images are outputted.

14 Claims, 6 Drawing Sheets

SYSTEM AND METHOD FOR WEB CONTENT EXTRACTION

BACKGROUND

Users are spending more time on the Internet performing more and more activities from online shopping to banking; meanwhile, Internet sites are getting more complex in design and content. For example, one common way of performing activities on the Internet is through Webpages, which are hyper text markup language (HTML) pages provided by a server.

Websites are becoming more cluttered with guides and menus attempting to improve user's efficiency, but instead these guides and menus often end up distracting from actual content of interest and can be less informative and can include, typically, unrelated material. Further, these guides and menus can complicate Web content extraction and Web printing. These "features" may include script and flash-driven animations, navigation menus, pop-up advertisements, obtrusive banner advertisements, unnecessary images or links to related stories scattered around the Webpage and so on.

Providing user friendly experience for Web printing can very much depend on extracting desired information from semi-structured HTML pages which include these guides and menus. One solution to this problem proposes a template-independent method for Web content extraction based on some visual features. Another solution proposes using a global heuristic of maximum subsequence segmentation based on word-level local classifiers and applying it to the domain of Websites. However, these methods may not accurately extract the Web content and therefore are not amicable to Web printing because they work on identifying only the boundary of the text-body and this can result in extracting unwanted content, such as link-lists related to stories and advertisements that may exist within the identified boundary. Also, these methods may not detect paragraph separation within the text-body. Furthermore, the second solution is dependent on content domains and writing languages.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for Web content extraction is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The terms "text segment" and "paragraph" are used interchangeably throughout the document.

Figure 1:
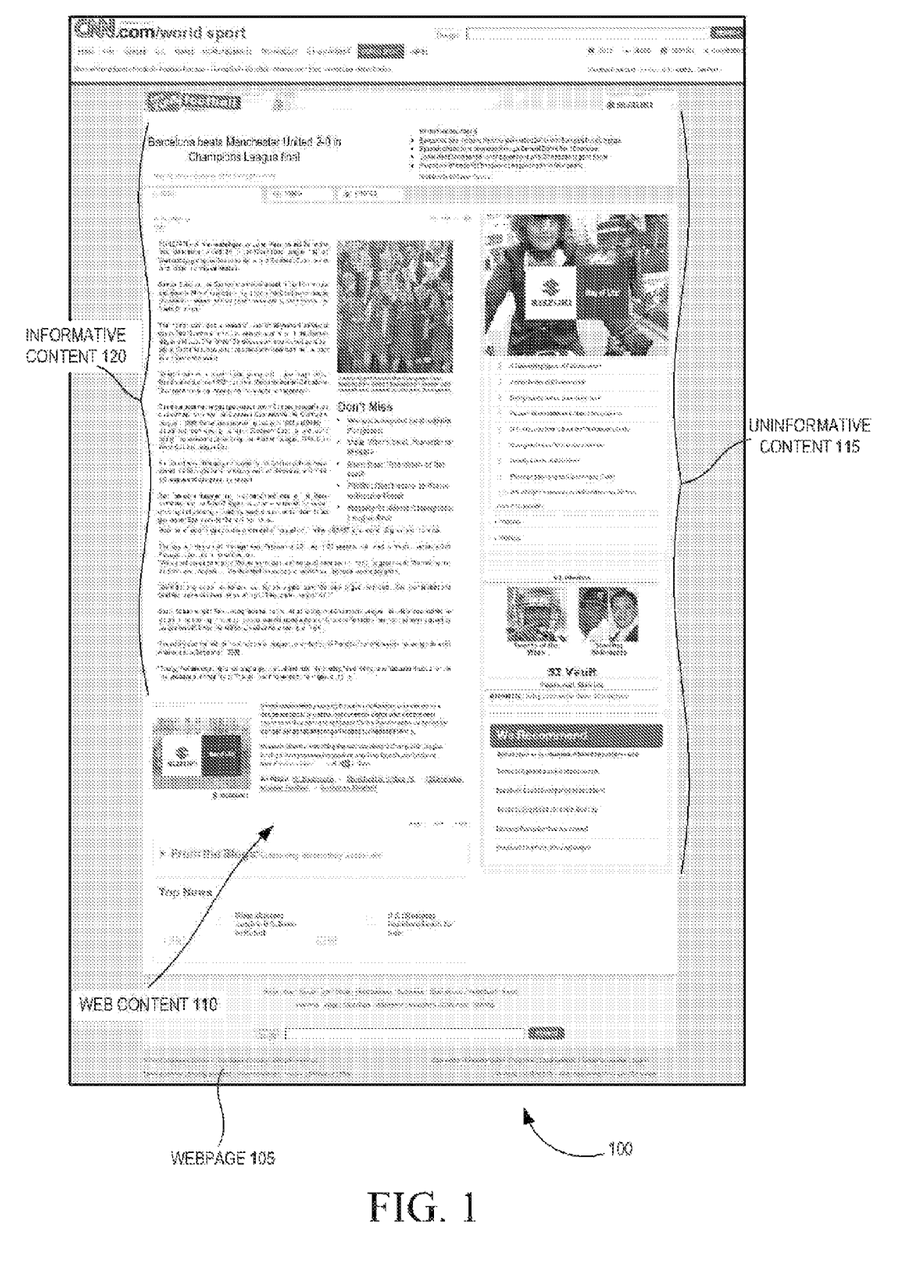
FIG. 1 illustrates a screenshot view of a Webpage having Web content, in the context of the invention.

FIG. 1 illustrates a screenshot view 100 of a Webpage 105 having Web content 110, in the context of the invention. It can be seen in FIG. 1 that, the Web content 110 may include uninformative content 115, such as script and flash-driven animations, navigation menus, pop-up advertisements, obtrusive banner advertisements, unnecessary images or links to related stories scattered around the Webpage 105 and so on along with informative content 120 which a user is interested in printing. The uninformative content 115 present in the Webpage 105 may complicate extraction of the informative content 120 for Web printing. Also, a print output of the Webpage 105 may include more of uninformative content 115 rather than the informative content 120, which may result in a non-friendly user experience in printing the Webpage 105.

Figure 2:
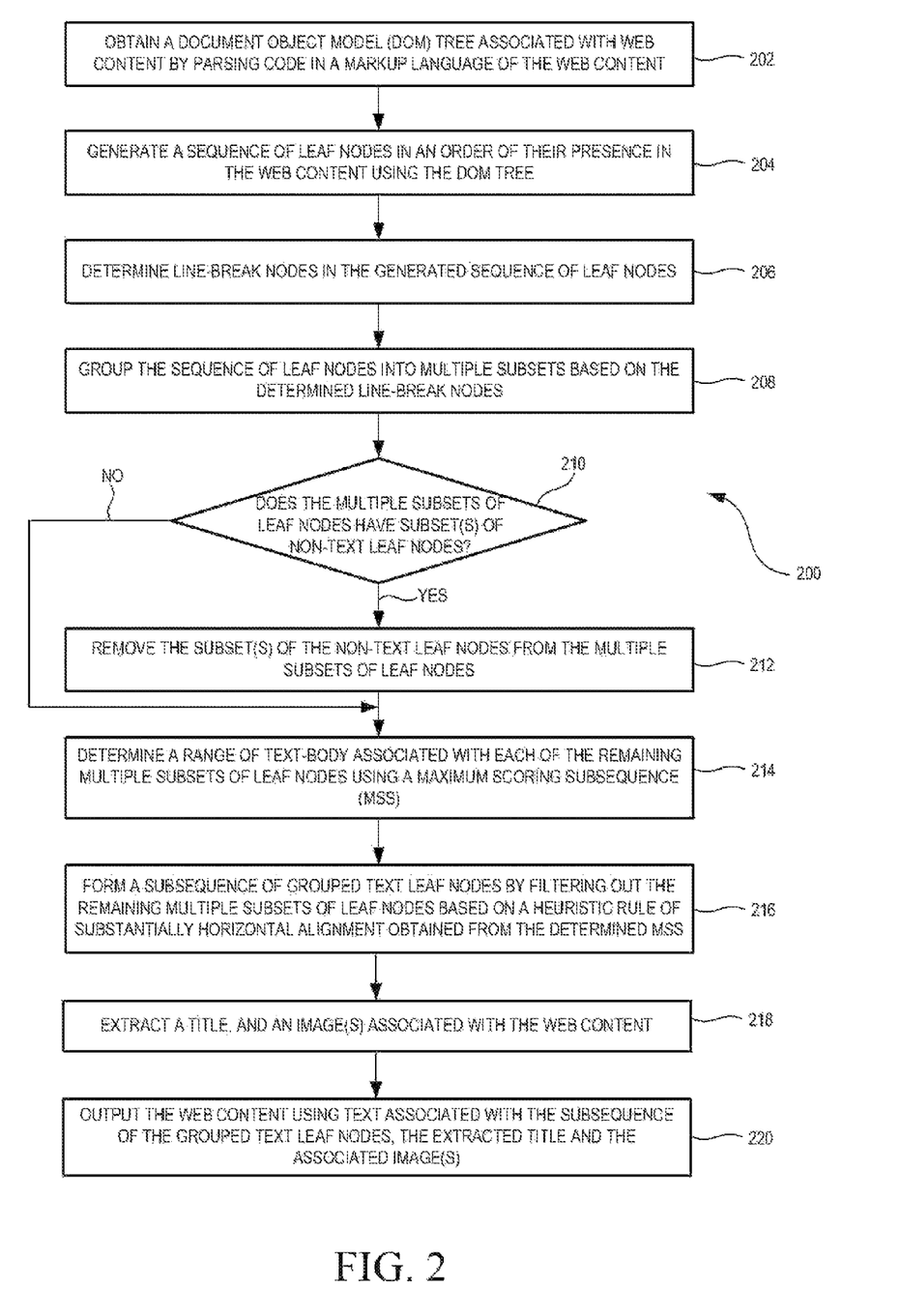
FIG. 2 illustrates a computer implemented flow diagram of a method for extracting Web content in a Webpage for Web printing, according to one embodiment.

FIG. 2 illustrates a computer implemented flow diagram of a method 200 for extracting Web content in a Webpage for Web printing, according to one embodiment. At step 202, a DOM tree associated with the Web content, for example, the Web content 110 of FIG. 1, in a Webpage, for example, the Webpage 105 of FIG. 1, is obtained. The DOM tree may be obtained by parsing code in a markup language of the Web content. The markup language may be a hypertext markup language (HTML), a wireless markup language (WML) and an extensible markup language (XML) and the like. At step 204, a sequence of leaf nodes is generated in an order of their presence in the Web content using the DOM tree.

At step 206, line-break nodes in the DOM tree are determined in the generated sequence of leaf nodes. At step 208, the sequence of leaf nodes is grouped into multiple subsets of leaf nodes based on the determined line-break nodes. The multiple subsets of leaf nodes may include subsets of text leaf nodes and/or subsets of non-text leaf nodes. In one example embodiment, the multiple subsets of leaf nodes are formed based on leaf nodes that are substantially successive to a nearest line-break node (NLN) to the leaf nodes. For a particular leaf node n, an NLN for the leaf node n may be the first line-break node along the shortest path from the leaf node n to a root node which is the top node of the DOM tree. At step 210, it is determined whether the multiple subsets of leaf nodes include one or more subsets of non-text leaf nodes.

If it is determined that the multiple subsets include the one or more subsets of non-text leaf nodes, then the one or more subsets of non-text leaf nodes are removed from the multiple subsets of leaf nodes at step 212. Each of the remaining multiple subsets of leaf nodes including the text leaf nodes may correspond to a text segment or a paragraph in the Web content. It can be noted that, the paragraph may refer to a paragraph associated with the informative content 120 of FIG. 1. Thus, one or more paragraphs in the Web content may be identified based on grouping of the multiple subsets of leaf nodes including the text leaf nodes.

The method 200 then continues at step 214. Also, step 214 is performed, if it is determined that the multiple subsets of leaf nodes do not include the one or more subsets of non-text leaf nodes. At step 214, a range of text-body associated with each of the remaining multiple subsets of leaf nodes is determined using a maximum scoring subsequence (MSS). The MSS may be determined based on visual features of a text format for each of the remaining multiple subsets of leaf nodes. The visual features of the text format may include font size, font color, whether the text is a link, and the like.

At step 216, a subsequence of grouped text leaf nodes is formed by filtering out the remaining multiple subsets of leaf nodes based on a heuristic rule of substantially horizontal alignment obtained from the determined MSS. In this manner, the steps 202 through 216 may enable extraction of the Web content in the Webpage by identifying paragraphs based on line-break node determination. At step 218, a title(s) and an image(s) associated with the Web content, which is within the range of the text-body, are extracted from the Webpage. At step 220, the Web content is outputted using text associated with the subsequence of grouped text leaf nodes, the title(s) and the image(s) associated with the Web content. In one embodiment, the outputted Web content may be printed using a printer. The process of Web content extraction is further described in greater detail with respect to FIGS. 3A through 6.

Figure 3A:
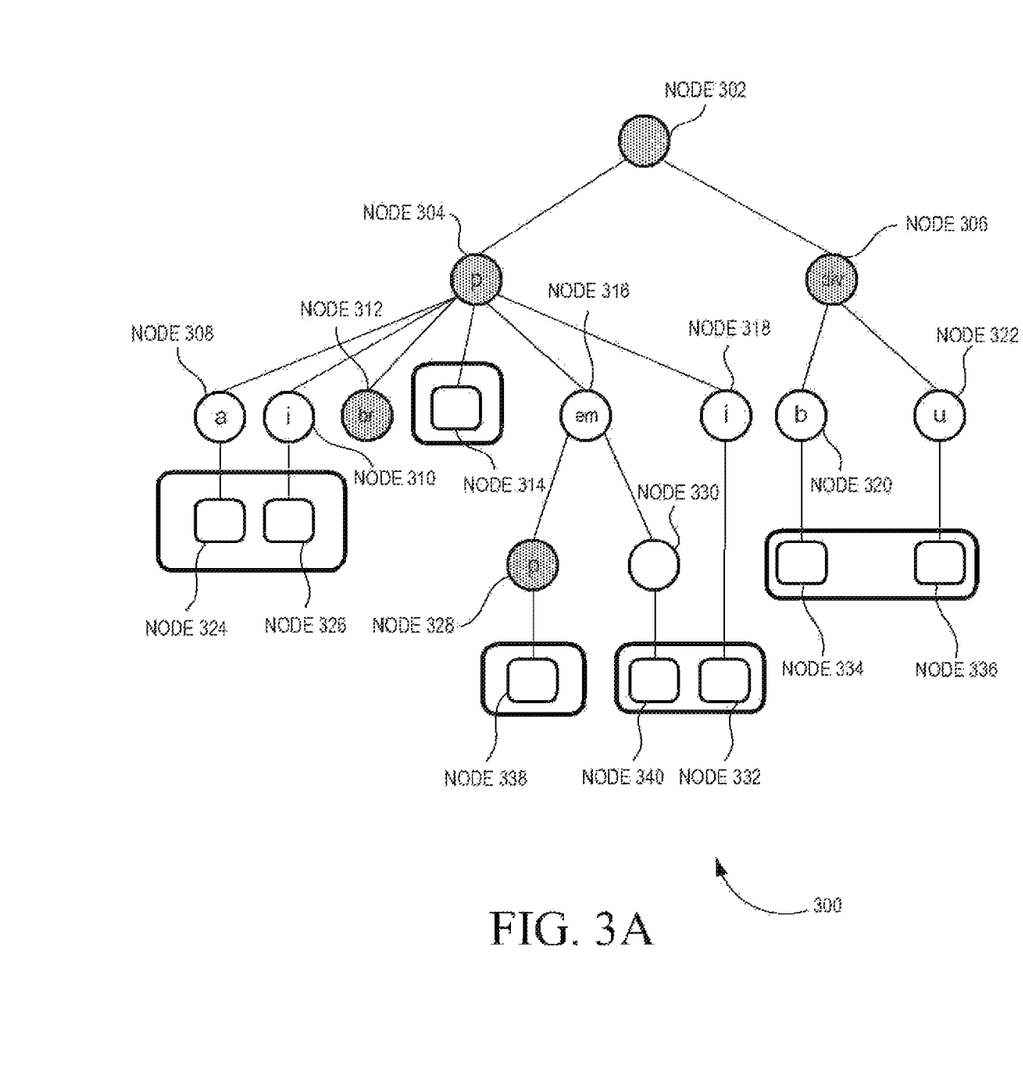
FIGS. 3A and 3B illustrate a document object model (DOM) tree and a Webpage corresponding to the DOM tree respectively, according to one embodiment.
Figure 3B:
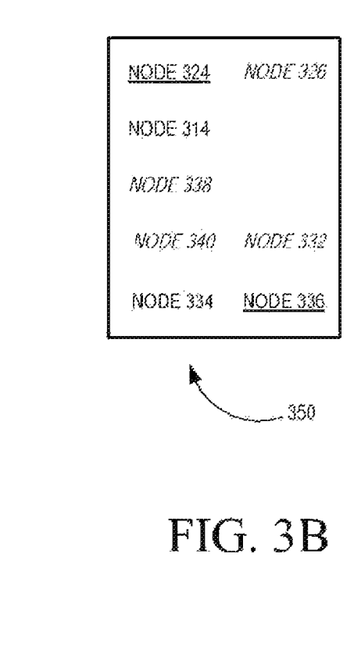

FIGS. 3A and 3B illustrate a DOM tree 300 and a Webpage 350 corresponding to the DOM tree 300 respectively, according to one embodiment. The DOM tree 300 may be a logical tree-structure of the Webpage 350 in an HTML format obtained by parsing HTML code of the Webpage 350. For example, the logical tree-structure starts at a root node and branches out to include text nodes at the lowest level of the logical tree-structure. Further, the nodes in the logical tree-structure may be related to each other and may be accessed, deleted, modified and new nodes may be created. In one embodiment, the DOM tree 300 may help identify text segments in the Webpage 350.

As shown in FIG. 3A, the DOM tree 300 includes tag nodes, line-break nodes and leaf nodes. As illustrated, the tag nodes are represented as circular nodes, the line-break nodes are represented as shaded circular nodes and the leaf nodes are represented as rectangular nodes. The tag nodes may be nodes with HTML tags. For example, nodes 308, 310, 316, 318, 320, 322, and 330 are the tag nodes in the DOM tree 300. Further, in the DOM tree 300, a node may be considered as a line-break node if value of a cascading style sheets (CSS) display property of the node is a block or the node includes single-tag node br or hr.

For example, if the value of the CSS display property of the node is a block, a text segment may be displayed as a block level text segment with a line-break before and after the text segment. The value of the CSS display property may be obtained upon rendering a Webpage. Further, the single-tag node br or hr may generate a line-break after a text segment. As shown, in the DOM tree 300, nodes 302, 304, 306, 312 and 328 are the line-break nodes.

Furthermore, in the DOM tree 300, the leaf node may be a node that has zero child nodes and placed farthest from a root node 302 of the DOM tree 300. As shown, nodes 314, 324, 326, 332, 334, 336, 338, and 340 are the leaf nodes in the DOM tree 300. The node 312 includes a single tag br, i.e., not paired, while the nodes 304, 306, 328 include paired tags such as div, p and block-quote.

As illustrated in FIG. 3B, the appearance of the Webpage 350 corresponding to the DOM tree 300 may be as follows:

text in the node 324 and the node 326;
text in the node 314;
text in the node 338;
text in the node 340 and the node 332; and
text in the node 334 and the node 336.

According to an embodiment of the present invention, a sequence of the leaf nodes in the order of their presence in the Web content may be generated using the DOM tree 300. For example, the leaf nodes are generated in the sequence of {node 324, node 326, node 312, node 314, node 338, node 340, node 332, node 334, node 336}.

Once the sequence of the leaf nodes is generated, the leaf nodes that are substantially successive to a NLN in the sequence are grouped to form a subset of leaf nodes. The leaf nodes with their respective NLNs are shown in Table 1 below.

TABLE 1

| LEAF NODE | NLN |
| --- | --- |
| NODE 324 | NODE 304 |
| NODE 326 | NODE 304 |
| NODE 312 | NODE 312 |
| NODE 314 | NODE 304 |
| NODE 338 | NODE 328 |
| NODE 340 | NODE 304 |
| NODE 332 | NODE 304 |
| NODE 334 | NODE 306 |
| NODE 336 | NODE 306 |

For example, from the DOM tree 300, the leaf nodes are grouped into multiple subsets of leaf nodes as subset {node 324, node 326}, subset {node 312}, subset {node 314}, subset {node 338}, subset {node 340, node 332}, and subset {node 334, node 336}. It can be noted that, even though the node 314 and the node 340 have the same NLN as shown in Table 1, they are not grouped together to form a single subset as the node 314 and the node 340 are not successive to each other in the sequence of leaf nodes. Also, subsets with single-tag node or with non-text leaf nodes are removed from the group of multiple subsets of leaf nodes. For example, the node 312 is a non-text leaf node and is hence removed from the group of the multiple subsets of leaf nodes.

Accordingly, the remaining multiple subsets of leaf nodes include text leaf nodes, depicted as rectangular nodes in FIG. 3. The remaining multiple subsets of leaf nodes may include subset {node 324, node 326}, subset {node 314}, subset {node 338}, subset {node 340, node 332}, and subset {node 334, node 336}. It can be noted that, each of the above multiple subsets of text leaf nodes, also referred to as grouped text leaf nodes, may correspond to a text segment or a paragraph in the Webpage 350. In this manner, text segments {node 324, node 326}, {node 314}, {node 338}, {node 340, node 332}, and {node 334, node 336} are identified using the DOM tree 300. The one or more nodes that correspond to a text segment are shown within a rectangle in FIG. 3. Using the identified text segments, a sequence of the identified text segments may be generated as $s_1$={node 324, node 326}, $s_2$={node 314}, $s_3$={node 338}, $s_4$={node 340, node 332} and $s_5$={node 334, node 336}.

Figure 4:
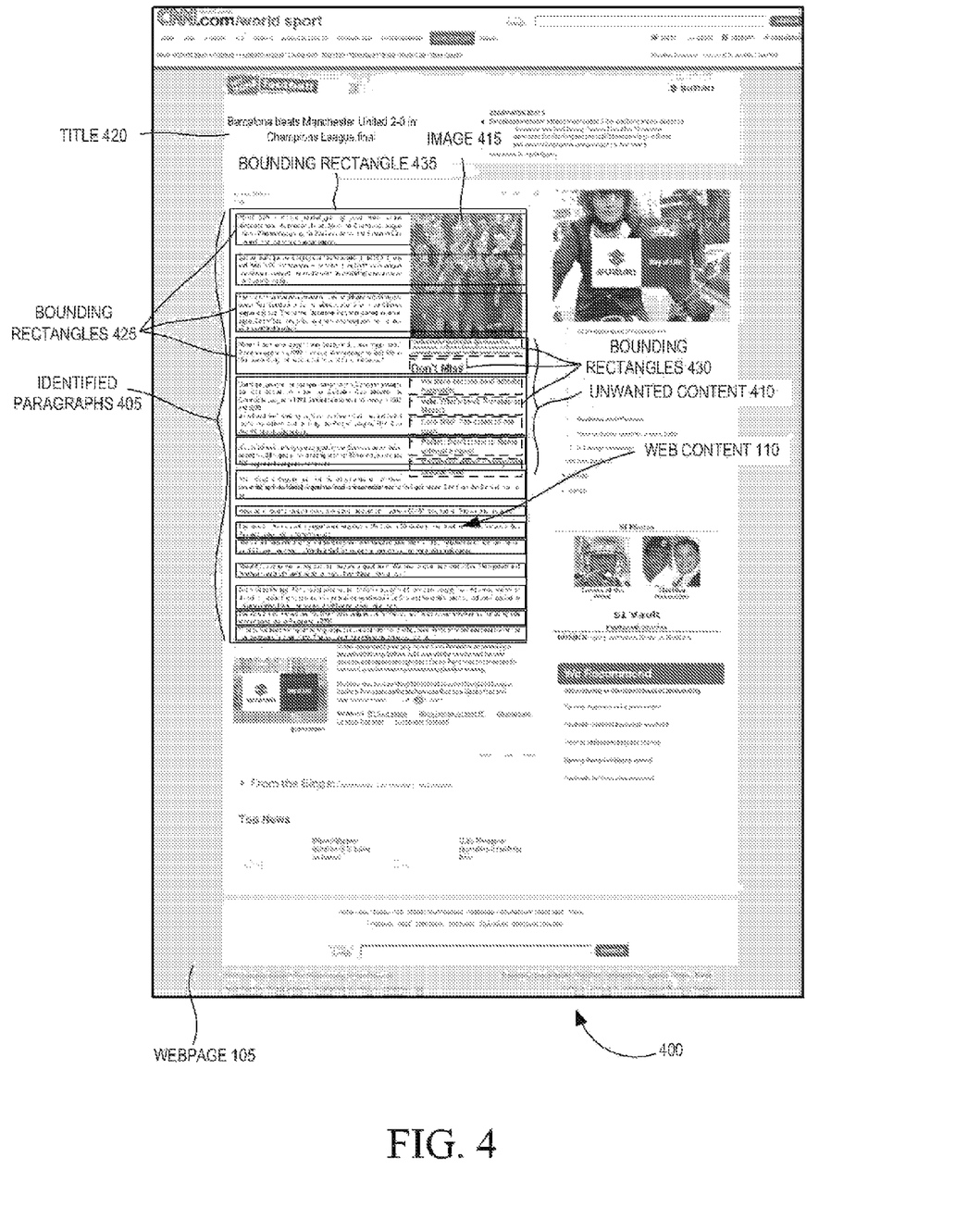
FIG. 4 illustrates a screenshot view showing identified paragraphs in the Webpage shown in FIG. 1, on which a global optimization method and an outlier elimination method are applied to refine the identified paragraphs, according to one embodiment.

FIG. 4 illustrates a screenshot view 400 showing identified paragraphs 405 in the Webpage 105 shown in FIG. 1, on which a global optimization method and an outlier elimination method are applied to refine the identified paragraphs 405, according to one embodiment. The global optimization method may include determining a subsequence of grouped text leaf nodes using visual features of text format in the grouped text leaf nodes. The visual features may include font color, font size, whether the text includes any link, whether the text includes decoration styles such as bold, italics and the like. In one example embodiment, the global optimization method may be applied to the identified paragraphs 405 to determine a range of text-body for each of the multiple subsets of leaf nodes using a MSS as described below.

For a given sequence of the identified paragraphs 405 $\vec{s} = (s_1, \ldots, s_n)$, a value sequence $\vec{v} = (v_1, \ldots, v_n)$, where $\vec{v}$ belongs to real numbers, may be calculated using the formula:

$$v_i = F(s_i) \cdot \text{StringLength}(s_i),$$

where $F(s_i)$ is a score given to an identified paragraph $s_i$ in the Webpage 105 and StringLength ($s_i$) is a string length of the text in the identified paragraph $s_i$. $F(s_i)$ is a segment level classifier function having a value (−1, 1). It can be noted that, higher the value of segment level classifier $F(s_i)$, it is probable that the identified paragraph $s_i$ is in the range of text-body. $F(s_i)$ can be formulated based on the visual features for the identified paragraph $s_i$, such as whether the text is in frequently used font size, frequently used font color, whether the text includes any link, whether the text includes decoration styles such as bold, italics and the like.

Further, the MSS of the value sequence $\vec{v}$ is given as:

$$T = (v_a, v_{a+1}, \ldots, v_b),$$

where $1 \leq a \leq b \leq n$, and a and b are given by:

$$(a, b) = \operatorname{argmax}_{x,y} \sum_{i=x}^{y} v_i.$$

It is appreciated that, the computation of the MSS for a value sequence $\vec{v}$ is well known to a person skilled in the art. Once the range of text-body is determined, the outlier elimination method may be applied to the text-body in the range. In one embodiment, unwanted content 410 from the determined range of the text-body may be filtered out using a heuristic rule of substantially left and right alignment obtained from the determined MSS. The heuristic rule of substantially left and right alignment may be based on the fact that the identified paragraphs 405 often overlap largely in a horizontal direction.

In one example embodiment, after rendering the Webpage 105, horizontal position information of the identified paragraphs 405 may be provided in a DOM tree. For example, in the DOM tree, horizontal position information of each tag node may be expressed as a rectangle which bounds the area of the tag node and its descendants. The bounding rectangle of the identified paragraphs 405 may be defined as a rectangle on a shared NLN of text leaf nodes associated with the identified paragraphs 405. For example, in FIG. 3, the NLN of the nodes 324 and 326 is the node 304 and hence a rectangle bounding the nodes 324 and 326 may be defined as the bounding rectangle on the node 304.

It can be seen from FIG. 4 that, bounding rectangles 425 of the identified paragraphs 405, represented by solid lines, have left and right coordinates. However, bounding rectangles 430, represented by dash lines, for captions below an image 415 and links to related stories cover a small portion of the horizontal range of the identified paragraphs 405. Using this property, the unwanted content 410 in the bounding rectangles 430 of the identified paragraphs 405 may be filtered out. After filtering out the unwanted content 410 from the identified paragraphs 405, a rectangle 435 bounding the identified paragraphs 405 may be identified. Further, a title 420 and the image 415 associated with the Web content 110 may be extracted with respect to the bounding rectangle 435 for Web printing.

Figure 5:
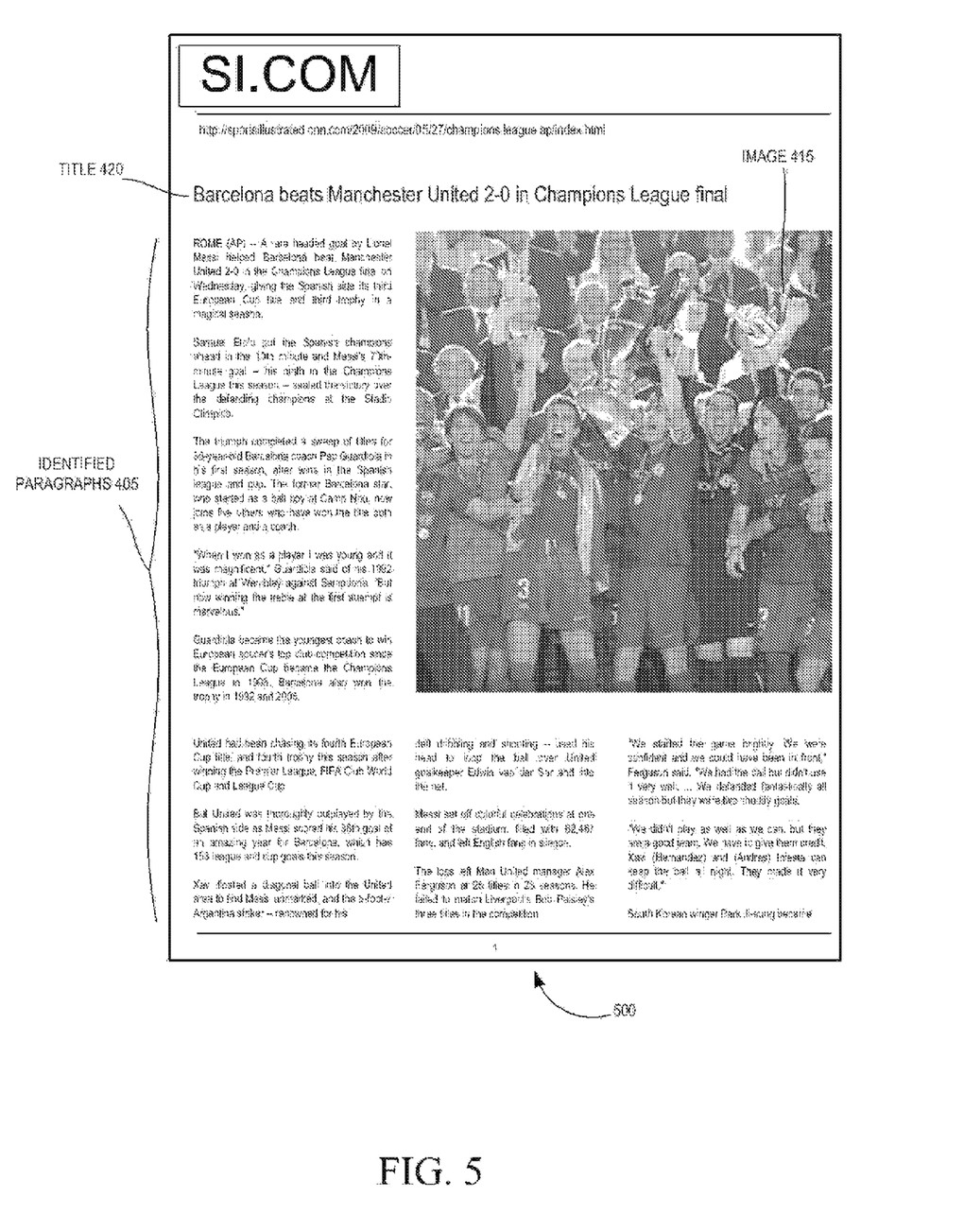
FIG. 5 illustrates a print output obtained using the method for Web content extraction shown in FIG. 2, according to one embodiment.

FIG. 5 illustrates a print output 500 obtained using the method 200 for Web content extraction shown in FIG. 2, according to one embodiment. The identified paragraphs 405, the image 415 and the title 420 extracted using the Web content extraction method 200 may be fed to a re-layout algorithm to generate a readable and printable portable document format (PDF) file. The printable PDF file may be outputted to a printer for obtaining the print output 500. It can be seen in FIG. 5 that, the unwanted content 410, such as unwanted text, unwanted images, links, advertisements and so on, present in the Webpage 105 are not printed in the print output 500, thereby providing a user friendly experience in Web printing.

Figure 6:
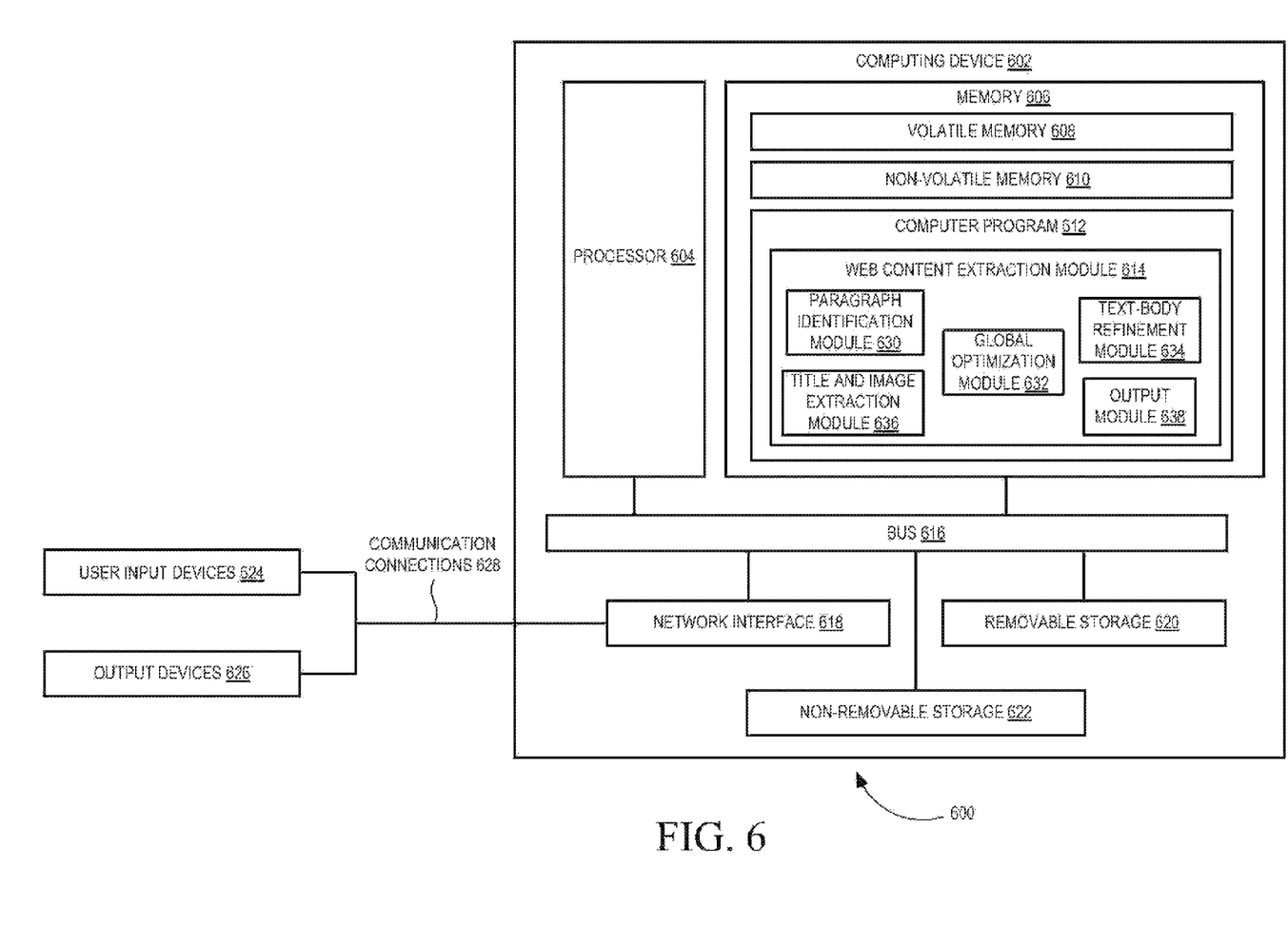
FIG. 6 illustrates an example of a suitable computing system environment for implementing embodiments of the present subject matter.

FIG. 6 illustrates an example of a suitable computing system environment 600 for implementing embodiments of the present subject matter. FIG. 6 and the following discussion are intended to provide a brief, general description of the suitable computing system environment 600 in which certain embodiments of the inventive concepts contained herein may be implemented.

A general computing device 602, in the form of a personal computer or a mobile device may include a processor 604, memory 606, a removable storage 620, and a non-removable storage 622. The computing device 602 additionally includes a bus 616 and a network interface 618. The computing device 602 may include or have access to the computing system environment 600 that includes one or more user input devices 624, one or more output devices 626, and one or more communication connections 628 such as a network interface card or a universal serial bus connection.

The one or more user input devices 624 may be a digitizer screen and a stylus, trackball, keyboard, keypad, mouse, and the like. The one or more output devices 626 may be one or more printers coupled to the processor 604 of the computing device 602, a display device of the computing device 602 and the like. The communication connections 628 may include a local area network, a wide area network, and/or other networks.

The memory 606 may include volatile memory 608 and non-volatile memory 610. A variety of non-transitory computer-readable storage media may be stored in and accessed from the memory elements of the computing device 602, such as the volatile memory 608 and the non-volatile memory 610, the removable storage 620 and the non-removable storage 622. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 604, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 604 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 604 of the computing device 602.

For example, a computer program 612 may include machine-readable instructions capable of Web content extraction for Web printing, according to the teachings and herein described embodiments of the present subject matter. In one embodiment, the computer program 612 may be included on a compact disk-read only memory (CD-ROM) and loaded from the CD-ROM to a hard drive in the non-volatile memory 610. The machine-readable instructions may cause the computing device 602 to encode according to the various embodiments of the present subject matter.

As shown, the computer program 612 includes a Web content extraction module 614. The Web content extraction module 614 includes a paragraph identification module 630, a global optimization module 632, a text-body refinement module 634, a title and image extraction module 636 and an output module 638. In one exemplary operation, the paragraph identification module 630 may extract Web content in a Webpage by identifying paragraphs in the Web content based on line-break node determination. The Web content may include formatted content, for example, in a particular font size, font color, and the like, in a markup language which may be HTML, WML, XML, and the like.

For extracting the Web content, the paragraph identification module 630 may obtain a DOM tree associated with Web content, for example, the Web content 110 of FIG. 1, in a Webpage, for example, the Webpage 105 of FIG. 1, by parsing code in the markup language of the Web content. The paragraph identification module 630 may generate a sequence of leaf nodes in the DOM tree in an order of their presence in the Web content using the DOM tree.

The paragraph identification module 630 may then determine line-break nodes in the generated sequence of leaf nodes. Further, the paragraph identification module 630 may group the sequence of leaf nodes into multiple subsets of leaf nodes based on the determined line-break nodes. The multiple subsets of leaf nodes may include subsets of text leaf nodes and/or subsets of non-text leaf nodes. In one example embodiment, the multiple subsets of leaf nodes are formed based on leaf nodes that are substantially successive to an NLN to the leaf nodes. Furthermore, the paragraph identification module 630 may determine whether the multiple subsets of leaf nodes include one or more subsets of non-text leaf nodes.

If it is determined that the multiple subsets of leaf nodes include the one or more subsets of non-text leaf nodes, then the paragraph identification module 630 may remove the one or more subsets of non-text leaf nodes from the multiple subsets of leaf nodes. Thus, one or more paragraphs in the Web content may be identified based on grouping of the multiple subsets of leaf nodes including the text leaf nodes.

Further, the global optimization module 632 may determine a range of text-body associated with each of the remaining multiple subsets of leaf nodes using a MSS. The MSS may be determined based on visual features of a text format for each of the remaining multiple subsets of leaf nodes. The visual features of the text format may include font size, font color, whether the text is a link, and the like.

Additionally, the text-body refinement module 634 may form a subsequence of grouped text leaf nodes by filtering out the remaining multiple subsets of leaf nodes based on a heuristic rule of substantially horizontal alignment obtained from the determined MSS. The title and image extraction module 636 may extract one or more titles and one or more images associated with the Web content. The output module 638 may output the Web content including text associated with the subsequence of grouped text leaf nodes, the one or more titles and the one or more images associated with the Web content to the output devices 626. In one embodiment, the output devices 626 may include the printers which print the outputted Web content.

Further, the non-transitory computer-readable storage medium, stored in and accessed from the memory elements of the computing device 602, has instructions that when executed by the computing device 602, causes the computing device 602 to perform the method of Web content extraction for Web printing. The method includes extracting the Web content in the Webpage by identifying paragraphs, one or more titles, and one or more images in the Web content based on line-break node determination. For extracting the Web content, the non-transitory computer-readable storage medium may have instructions to obtain a DOM tree associated with the Web content in the Webpage by parsing code in a markup language of the Web content. The non-transitory computer-readable storage medium may have instructions to generate a sequence of leaf nodes in the DOM tree in an order of their presence in the Web content using the DOM tree.

Further, the non-transitory computer-readable storage medium may have instructions to determine line-break nodes in the DOM tree in the generated sequence of leaf nodes. The non-transitory computer-readable storage medium may also have instructions to group the sequence of leaf nodes into multiple subsets of leaf nodes based on the determined line-break nodes. In one example embodiment, the multiple subsets of leaf nodes are formed based on leaf nodes that are substantially successive to a NLN to the leaf nodes. Furthermore, the non-transitory computer-readable storage medium may have instructions to determine whether the multiple subsets of leaf nodes include one or more subsets of non-text leaf nodes.

If it is determined that the multiple subsets of leaf nodes include the one or more subsets of non-text leaf nodes, then the non-transitory computer-readable storage medium may have instructions to remove the one or more subsets of non-text leaf nodes from the multiple subsets of leaf nodes. Thus, one or more paragraphs in the Web content may be identified based on grouping of the multiple subsets of leaf nodes including text leaf nodes.

Additionally, the non-transitory computer-readable storage medium may have instructions to determine a range of text-body associated with each of the remaining multiple subsets of leaf nodes using a MSS. The MSS may be determined based on visual features of a text format for each of the remaining multiple subsets of leaf nodes. The visual features of the text format may include font size, font color, whether the text is a link, and the like.

Moreover, the non-transitory computer-readable storage medium may have instructions to form a subsequence of grouped text leaf nodes by filtering out the remaining multiple subsets of leaf nodes based on a heuristic rule of substantially horizontal alignment obtained from the determined MSS. Further, the non-transitory computer-readable storage medium may extract one or more titles and one or more images associated with the Web content. The non-transitory computer-readable storage medium may also have instructions to output the Web content including text associated with the subsequence of grouped text leaf nodes, the one or more titles and the one or more images associated with the Web content. In one embodiment, the non-transitory computer-readable storage medium may have instructions to print the outputted Web content.

In various embodiments, the methods and systems described in FIGS. 1 through 6 may identify relevant paragraphs from a Webpage and identify relevant paragraphs using a DOM tree and visual features associated with the Webpage. The above-described methods and systems may filter-out uninformative content, advertisements, links and so on from the identified paragraphs, thus further refining the Web content for Web printing. Thus, the above-described methods and systems may provide a user friendly experience in Web printing as relevant and informative Web content is printed as a print output. The above-described systems and methods may help achieve higher precision and recall in identifying text segments. Precision (P) and recall (R) at a text segment level for text-body extraction is given by:

$$P = \frac{|S_p \cap S_l|}{|S_p|}, R = \frac{|S_p \cap S_l|}{|S_l|},$$

where, $S_p$ is a set of identified text segments in the extracted text-body and $S_l$ is a set of paragraphs in the Webpage. In one exemplary implementation, a precision of 91.571% and a recall of 99.145% is achieved when the above-described computer implemented method 200, as illustrated in FIG. 2, is used to extract Web content from 95 randomly selected news related Websites for Web printing.

Further, the above-described method may enable extraction of the Web content irrespective of content domains, writing languages and Webpage templates. Although in the above description of FIGS. 2 through 6, the extracted Web content is used for Web printing, it can be noted that the extracted Web content may be also used for displaying on a display of a mobile device or may be used for Webpage cleaning during Web searching.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A computer implemented method for Web content extraction, comprising:
    extracting Web content in a Webpage by identifying at least one paragraph, at least one title and at least one image in the Web content based on line-break node determination, wherein the extracting includes
        generating a sequence of leaf nodes in an order of their presence in the Web content in the Webpage;
        determining nodes representing line-breaks in the generated sequence of leaf nodes, wherein the determined nodes representing the line-breaks are line-break nodes; and
        grouping the sequence of leaf nodes into multiple subsets of leaf nodes including at least one of text leaf nodes and non-text leaf nodes based on the determined line-break nodes;
        determining whether the multiple subsets of leaf nodes include at least one subset of the non-text leaf nodes; and
        if so, removing the at least one subset of the non-text leaf nodes from the multiple subsets of leaf nodes to identify the at least one paragraph; and
    outputting the Web content including the identified at least one paragraph, the at least one title, and the at least one image.

2. The computer implemented method of claim 1, wherein outputting the Web content including the at least one identified paragraph, the at least one title and the at least one image comprises:
    outputting the Web content using text associated with remaining multiple subsets of leaf nodes including the text leaf nodes.

3. The computer implemented method of claim 2, wherein grouping the sequence of leaf nodes into multiple subsets of leaf nodes comprises:
    determining leaf nodes that are successive in the sequence and are connected to a nearest line-break node; and
    for each of the multiple subsets of leaf nodes, grouping the leaf nodes into the subset if the leaf nodes are successive in the sequence and are connected to the same line-break node.

4. The computer implemented method of claim 3, wherein outputting the Web content using text associated with the remaining multiple subsets of leaf nodes including the text leaf nodes comprises:
    determining a subsequence of grouped text leaf nodes from the remaining multiple subset of leaf nodes including the text leaf nodes; and
    outputting the Web content using text associated with the subsequence of grouped text leaf nodes.

5. The computer implemented method of claim 4, wherein determining the subsequence of grouped text leaf nodes from the remaining multiple subsets of leaf nodes comprises:
    determining the subsequence of grouped text leaf nodes using visual features of a text format in the remaining multiple subsets of leaf nodes.

6. The computer implemented method of claim 5, wherein, in determining the subsequence of grouped text leaf nodes, the visual features of the text format in the remaining multiple subsets of leaf nodes are selected from the group consisting of font size, font color, and whether the text is in a link.

7. The computer implemented method of claim 5, wherein determining the subsequence of grouped text leaf nodes using the visual features of the text format in the remaining multiple subsets of leaf nodes, comprises:
    determining a range of text-body associated with each of the remaining multiple subsets of leaf nodes using a maximum scoring subsequence (MSS) that is based on the visual features for each of the remaining multiple subsets of leaf nodes; and
    forming the subsequence of grouped text leaf nodes by filtering out the remaining multiple subsets of leaf nodes based on a heuristic rule of substantially horizontal alignment obtained from the determined MSS.

8. The computer implemented method of claim 1, wherein, in generating the sequence of leaf nodes, the Web content comprises formatted content in a markup language, and wherein the markup language is selected from the group consisting of hypertext markup language (HTML), wireless markup language (WML) and extensible markup language (XML).

9. The computer implemented method of claim 1, wherein generating the sequence of leaf nodes in the order of their presence in the Web content in the Webpage comprises:
   obtaining a document object model (DOM) tree associated with the Web content by parsing code in the markup language of the Webpage; and
   generating the sequence of leaf nodes in the order of their presence in the Web content using the obtained DOM tree.

10. A non-transitory computer-readable storage medium having instructions that, when executed by a computing device, causes the computing device to perform Web content extraction, comprising:
   extracting Web content in a Webpage by identifying at least one paragraph, at least one title and at least one image in the Web content based on line-break node determination, wherein the extracting includes
      generating a sequence of leaf nodes in an order of their presence in the Web content in the Webpage;
      determining nodes representing line-breaks in the generated sequence of leaf nodes, wherein the determined nodes representing the line-breaks are line-break nodes; and
      grouping the sequence of leaf nodes into multiple subsets of leaf nodes including at least one of text leaf nodes and non-text leaf nodes based on the determined line-break nodes;
      determining whether the multiple subsets of leaf nodes include at least one subsets of the non-text leaf nodes; and
      if so, removing the at least one subsets of non-text leaf nodes from the multiple subsets of leaf nodes to identify the at least one paragraph; and
   outputting the Web content including the identified at least one paragraph, the at least one title and the at least one image.

11. The non-transitory computer-readable storage medium of claim 10, wherein the grouping the sequence of leaf nodes into multiple subsets of leaf nodes comprises:
   determining leaf nodes that are successive in the sequence and are connected to a nearest line-break node; and
   for each of the multiple subsets of leaf nodes, grouping the leaf nodes into the subset if the leaf nodes are successive in the sequence and are connected to the same line-break node.

12. A system for Web content extraction, comprising:
   a printer;
   a processor coupled to the printer; and
   memory coupled to the processor, wherein the memory includes a Web content extraction module, and wherein the Web content extraction module includes a paragraph identification module to extract Web content in a Webpage by identifying at least one paragraph, at least one title and at least one image in the Web content based on line-break node determination, wherein the extracting includes
      generating a sequence of leaf nodes in an order of their presence in the Web content in the Webpage,
      determining nodes representing line-breaks in the generated sequence of leaf nodes, wherein the determined nodes representing the line-breaks are line-break nodes, and
      grouping the sequence of leaf nodes into multiple subsets of leaf nodes including at least one of text leaf nodes and non-text leaf nodes based on the determined line-break nodes,
      determining whether the multiple subsets of leaf nodes include at least one subset of the non-text leaf nodes, and
      if so, removing the at least one subset of the non-text leaf nodes from the multiple subsets of leaf nodes to identify the at least one paragraph; and
   wherein the Web content extraction module includes an output module for outputting the extracted Web content to the printer.

13. The system of claim 12, wherein the output module outputs the Web content using text associated with remaining multiple subsets of leaf nodes including the text leaf nodes, wherein the Web content comprises formatted content in a markup language, and wherein the markup language is selected from the group consisting of hypertext markup language (HTML), wireless markup language (WML) and extensible markup language (XML).

14. The system of claim 12, wherein the grouping the sequence of leaf nodes into multiple subsets of leaf nodes comprises:
   determining leaf nodes that are successive in the sequence and are connected to a nearest line-break node; and
   for each of the multiple subsets of leaf nodes, grouping the leaf nodes into the subset if the leaf nodes are successive in the sequence and are connected to the same line-break node.

* * * * *